(12) United States Patent
Qiu et al.

(10) Patent No.: US 7,218,950 B2
(45) Date of Patent: May 15, 2007

(54) BASE STATION, MOBILE STATION, COMMUNICATION SYSTEM, TRANSMISSION CONTROL METHOD, AND MOBILE STATION CONTROL PROGRAM

(75) Inventors: Heng Qiu, Yokosuka (JP); Hidetoshi Kayama, Yokohama (JP); Jyunichirou Hagiwara, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 615 days.

(21) Appl. No.: 10/820,125

(22) Filed: Apr. 8, 2004

(65) Prior Publication Data

US 2004/0204101 A1 Oct. 14, 2004

(30) Foreign Application Priority Data

Apr. 11, 2003 (JP) ............................. 2003-108293

(51) Int. Cl.
*H04B 7/00* (2006.01)
(52) U.S. Cl. .................... 455/522; 455/561; 455/67.11
(58) Field of Classification Search ................ 455/522, 455/67.11, 561, 115.1, 423, 69, 424, 63.1; 370/335, 441; 375/146
See application file for complete search history.

(56) References Cited

U.S. PATENT DOCUMENTS

| | | | | |
|---|---|---|---|---|
| 6,094,428 A * | 7/2000 | Bruckert et al. | ............ | 370/335 |
| 6,226,502 B1 * | 5/2001 | Chung | ........................ | 455/118 |
| 6,556,839 B1 * | 4/2003 | Kondo | ........................ | 455/522 |
| 7,139,284 B1 * | 11/2006 | Furukawa et al. | .......... | 370/441 |
| 2002/0159413 A1 * | 10/2002 | Tsubouchi et al. | .......... | 370/335 |
| 2004/0071194 A1 * | 4/2004 | Suwa et al. | ................. | 375/146 |

OTHER PUBLICATIONS

W-CDMA IDO-Tsuushin-Houshiki, pp. 130-134, K. "Random Access Control" (with English translation), date unknown.

* cited by examiner

*Primary Examiner*—Matthew Anderson
*Assistant Examiner*—Tan Trinh
(74) *Attorney, Agent, or Firm*—Oblon, Spivak, McClelland, Maier & Neustadt, P.C.

(57) ABSTRACT

An object of the present invention is to reduce the volume of a control signal and shorten a delay of processing in a system comprising a base station configured to transmit a pilot signal at a predetermined transmission power and a mobile station configured to transmit a preamble prior to transmission/reception of data. A mobile station comprises means for spreading the preamble with a spreading code corresponding to a reception power or a signal interference ratio of the pilot signal at the host station, based on a correspondence between the spreading code and, the reception power or the signal interference ratio of the pilot signal at the host station (power code determiner and transmitted signal converter), and means for transmitting the preamble after the spreading process (transmitter); and a base station comprises means for determining a transmission power or a downlink transmission rate for a signal directed to the mobile station, according to the spreading code of the preamble received from the mobile station, based on the correspondence between the spreading code, and the reception power or the signal interference ratio of the pilot signal at the mobile station (spreading code measuring part, estimator, and transmission rate determiner).

10 Claims, 15 Drawing Sheets

Fig.10

| SINR OF PILOT | SINR OF CORRESPONDING DATA CHANNEL | NUMBER OF MULTIPLE CODES | MODULATION | CODING RATE |
|---|---|---|---|---|
| <4dB | <2dB | NOT TRANSMIT | | |
| 4dB~5dB | 2dB~3dB | 1 | QPSK | 0.17 |
| 5dB~6dB | 3dB~4dB | 1 | QPSK | 0.35 |
| 6dB~7dB | 4dB~5dB | 2 | QPSK | 0.43 |
| 7dB~10dB | 5dB~8dB | 3 | QPSK | 0.62 |
| 10dB~15dB | 8dB~13dB | 5 | 16QAM | 0.62 |
| 15dB~19dB | 13dB~17dB | 8 | 16QAM | 0.75 |
| 19dB~∞ | 17dB~∞ | 15 | 16QAM | 0.81 |

Fig.11

| PROPAGATION LOSS | MAXIMUM POSSIBLE TRANSMISSION RATE OF MOBILE STATION |
|---|---|
| >=142dB | 0 |
| 139dB~142dB | 32kbps |
| 130dB~139dB | 64kbps |
| 124dB~130dB | 384kbps |
| 118dB~124dB | 1.536Mbps |
| 115dB~118dB | 6.144Mbps |
| <=115dB | 12.288Mbps |

Fig.12

| PROPAGATION LOSS OF PILOT SIGNAL | INITIAL TRANSMISSION POWER OF PREAMBLE |
|---|---|
| >=142dB | NOT TRANSMIT |
| 139dB~142dB | 24dBm~21dBm |
| 130dB~139dB | 21dBm~12dBm |
| 124dB~130dB | 12dBm~6dBm |
| 118dB~124dB | 6dBm~0dBm |
| 115dB~118dB | 0dBm~ -3dBm |
| <=115dB | <= -3dBm |

Fig.13

| SINR OF CPICH (dB) | TRANSMISSION POWER OF PREAMBLE | SPREADING CODE NUMBER |
|---|---|---|
| <4dB OR REQUIRED TRANSMISSION POWER>24dBm | | NOT TRANSMIT |
| 4dB~5dB | 24dBm~21dBm | 0 |
| 5dB~6dB | 24dBm~21dBm | 1 |
| 6dB~7dB | 24dBm~21dBm | 2 |
| 7dB~10dB | 24dBm~21dBm | 3 |
| 10dB~15dB | 24dBm~21dBm | 4 |
| 15dB~19dB | 24dBm~21dBm | 5 |
| 19dB~∞ | 24dBm~21dBm | 6 |
| 4dB~5dB | 21dBm~12dBm | 7 |
| 5dB~6dB | 21dBm~12dBm | 8 |
| 6dB~7dB | 21dBm~12dBm | 9 |
| 7dB~10dB | 21dBm~12dBm | 10 |
| 10dB~15dB | 21dBm~12dBm | 11 |
| 15dB~19dB | 21dBm~12dBm | 12 |
| 19dB~∞ | 21dBm~12dBm | 13 |
| 4dB~5dB | 12dBm~6dBm | 14 |
| 5dB~6dB | 12dBm~6dBm | 15 |
| 6dB~7dB | 12dBm~6dBm | 16 |
| 7dB~10dB | 12dBm~6dBm | 17 |
| 10dB~15dB | 12dBm~6dBm | 18 |
| 15dB~19dB | 12dBm~6dBm | 19 |
| 19dB~∞ | 12dBm~6dBm | 20 |

Fig.14

| SINR OF CPICH (dB) | TRANSMISSION POWER OF PREAMBLE | SPREADING CODE NUMBER |
|---|---|---|
| 4dB~5dB | 6dBm~0dBm | 21 |
| 5dB~6dB | 6dBm~0dBm | 22 |
| 6dB~7dB | 6dBm~0dBm | 23 |
| 7dB~10dB | 6dBm~0dBm | 24 |
| 10dB~15dB | 6dBm~0dBm | 25 |
| 15dB~19dB | 6dBm~0dBm | 26 |
| 19dB~∞ | 6dBm~0dBm | 27 |
| 4dB~5dB | 0dBm~ -3dBm | 28 |
| 5dB~6dB | 0dBm~ -3dBm | 29 |
| 6dB~7dB | 0dBm~ -3dBm | 30 |
| 7dB~10dB | 0dBm~ -3dBm | 31 |
| 10dB~15dB | 0dBm~ -3dBm | 32 |
| 15dB~19dB | 0dBm~ -3dBm | 33 |
| 19dB~∞ | 0dBm~ -3dBm | 34 |
| 4dB~5dB | <= -3dBm | 35 |
| 5dB~6dB | <= -3dBm | 36 |
| 6dB~7dB | <= -3dBm | 37 |
| 7dB~10dB | <= -3dBm | 38 |
| 10dB~15dB | <= -3dBm | 39 |
| 15dB~19dB | <= -3dBm | 40 |
| 19dB~∞ | <= -3dBm | 41 |

Fig.15

| SINR OF CPICH (dB) | SPREADING CODE NUMBER |
|---|---|
| <4dB | NOT TRANSMIT |
| 4dB~5dB | 0 |
| 5dB~6dB | 1 |
| 6dB~7dB | 2 |
| 7dB~10dB | 3 |
| 10dB~15dB | 4 |
| 15dB~19dB | 5 |
| 19dB~∞ | 6 |

Fig.16

| TRANSMISSION POWER OF PREAMBLE | SPREADING CODE NUMBER |
|---|---|
| REQUIRED TRANSMISSION POWER>24dBm | NOT TRANSMIT |
| 24dBm~21dBm | 0 |
| 21dBm~12dBm | 1 |
| 12dBm~6dBm | 2 |
| 6dBm~0dBm | 3 |
| 0dBm~ -3dBm | 4 |
| <= -3dBm | 5 |

Fig.17

| PROPAGATION LOSS OF PILOT SIGNAL | INITIAL TRANSMISSION POWER OF PREAMBLE |
|---|---|
| >=142dB | NOT TRANSMIT |
| 140.5dB~142dB | 24dBm~22.5dBm |
| 138.5dB~140.5dB | 22.5dBm~20.5dBm |
| 136dB~138.5dB | 20.5dBm~18dBm |
| 132.5dB~136dB | 18dBm~14.5dBm |
| 126.5dB~132.5dB | 14.5dBm~8.5dBm |
| <=126.5dB | <=8.5dBm |

BASE STATION, MOBILE STATION, COMMUNICATION SYSTEM, TRANSMISSION CONTROL METHOD, AND MOBILE STATION CONTROL PROGRAM

BACKGROUND OF THE INVENTION

1. Field of the Invention

The present invention relates to a base station for transmitting a pilot signal at a predetermined transmission power, a mobile station for transmitting a preamble prior to a start of transmission/reception of data, a communication system for implementing radio communication based on code division multiplexing between the base station and the mobile station, a transmission control method, and a mobile station control program.

A "signal interference ratio" in the present specification means a power ratio of a signal to an interference signal with the signal. The interference signal herein can be the sum of the so-called interference signal (Interference) and noise signal (Noise) and, in this case, the signal interference ratio is called SINR (Signal Interference & Noise Ratio). The interference signal can also be defined by adopting the so-called interference signal (Interference) only and, in this case, the signal interference ratio is called SIR (Signal Interference Ratio). Embodiments of the invention described later will explain examples adopting SINR.

2. Related Background Art

The preamble power ramping is applied to random access of W-CDMA (cf. "W-CDMA Mobile Communications System" pp 130–134 (editorship: Keiji Tachikawa, publisher: Maruzen Co., Ltd.)). A preamble is a short signal transmitted prior to transmission of data packet, and a spreading code to be used is selected from sixteen types of limited spreading codes. Therefore, a base station can readily detect a preamble by means of a simple matched filter. Furthermore, the application of power ramping using this preamble can reduce the adverse effect of interference on other users due to control error of open-loop transmit power control. Specifically, a mobile station repeatedly transmits the preamble plural times until it receives an AI (Acquisition Indicator), which indicates detection of the preamble, from a base station. The mobile station gradually increases its transmission power every transmission of preamble. The mobile station terminates the transmission of preamble at a time of reception of an AI and starts transmitting a data packet at a power corresponding to a preamble transmission power at that time. The mobile station selects a spreading code to be used, at random every transmission of a preamble, and, when receiving an AI, it starts transmitting a data packet with a spreading code uniquely corresponding to a spreading code used for the last preamble, from a determined time (e.g., 4 ms) after the transmission of the last preamble.

SUMMARY OF THE INVENTION

However, the signal interference ratio of the signal from the base station measured at the mobile station is important information for determining a modulation method, a transmit power, etc. used on the occasion of transmitting a data packet from the base station to the mobile station, but there is provided no means for transmitting the information together upon the transmission of the preamble in the conventional method. It is thus necessary to separately transmit the information after completion of the preamble power ramping, which can pose problems of increase of control signals and occurrence of a delay of processing due to complicated processing including decoding of a signal before acquisition of the information. Furthermore, a propagation loss quantity between the mobile station and the base station is also important information on the occasion of allocating a radio resource to the mobile station or on the occasion of scheduling transmission from the mobile station. In a case where information about the transmission power of a control signal for reservation is transmitted as enclosed in the control signal, it is necessary to increase the volume of information for the control signal about the reservation, and the information can be read finally after completion of decoding of the control signal and complicated control such as error correction. This raised a problem of increase in the delay of processing.

The present invention has been accomplished in order to solve the above problems, and an object of the present invention is to provide a base station, a mobile station, a communication system, a transmission control method, and a mobile station control program capable of shortening the processing delay while reducing the volume of the control signal.

In order to achieve the above object, a base station according to the present invention is a base station configured to perform radio communication based on code division multiplexing with a mobile station which transmits a preamble prior to a start of transmission/reception of data, and to transmit a pilot signal at a predetermined transmission power to the mobile station, the base station comprising: preamble receiving means for receiving the preamble spread with a spreading code from the mobile station; correspondence storing means storing any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station; and determining means for determining at least one of a transmission power and a downlink transmission rate for a signal directed to the mobile station, and an uplink transmission rate for transmission of information from the mobile station, based on at least the spreading code. Preferably, the base station further comprises rate instructing means for instructing the mobile station to use the uplink transmission rate determined.

A mobile station according to the present invention is a mobile station configured to perform radio communication based on code division multiplexing with a base station which transmits a pilot signal at a predetermined transmission power, and to transmit a preamble to the base station prior to a start of transmission/reception of data, the mobile station comprising: correspondence storing means storing any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station; and spreading means for spreading the preamble with the spreading code corresponding to any one of the reception power or the signal interference ratio about the pilot signal at the mobile station, the preamble transmission power of the mobile station, and the combination of the reception power or the signal interference ratio of the pilot signal at the mobile station with the preamble transmission power of the mobile station, based on said correspondence.

A communication system according to the present invention is a communication system comprising a base station configured to transmit a pilot signal at a predetermined transmission power, and a mobile station configured to transmit a preamble to the base station prior to a start of transmission/reception of data, the communication system being configured to implement radio communication based on code division multiplexing between the base station and the mobile station, wherein the mobile station comprises: spreading means for spreading the preamble with a spreading code corresponding to any one of the reception power or the signal interference ratio about the pilot signal at the mobile station, the preamble transmission power of the mobile station, and the combination of the reception power or the signal interference ratio of the pilot signal at the mobile station with the preamble transmission power of the mobile station, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station; and preamble transmitting means for transmitting the preamble after the spreading process to the base station; and wherein the base station comprises: determining means for determining at least one of a transmission power and a downlink transmission rate for a signal directed to the mobile station, and an uplink transmission rate for transmission of information from the mobile station, corresponding to at least the spreading code, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station. Preferably, the communication system is characterized wherein the base station further comprises rate instructing means for instructing the mobile station to use the uplink transmission rate determined.

A transmission control method according to the present invention is a transmission control method of implementing radio communication based on code division multiplexing between a base station configured to transmit a pilot signal at a predetermined transmission power and a mobile station configured to transmit a preamble to the base station prior to a start of transmission/reception of data, the transmission control method comprising: a spreading step wherein the mobile station determines a spreading code corresponding to any one of the reception power or the signal interference ratio about the pilot signal at the mobile station, the preamble transmission power of the mobile station, and the combination of the reception power or the signal interference ratio of the pilot signal at the mobile station with the preamble transmission power of the mobile station, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station, and the mobile station spreads the preamble with the determined spreading code; a preamble transmitting step wherein the mobile station transmits the preamble after the spreading process to the base station; and a rate determining step wherein the base station determines at least one of a transmission power and a downlink transmission rate for a signal directed to the mobile station, and an uplink transmission rate for transmission of information from the mobile station, corresponding to at least the spreading code, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station. Preferably, the transmission control method further comprises rate instructing step wherein the base station instructs the mobile station to use the uplink transmission rate determined.

According to the invention as described above, the base station can determine the optimal transmission power or transmission rate to the mobile station, without need for the mobile station to separately notify the base station of the information about the reception power or signal interference ratio of the pilot signal, or the information about the preamble transmission power, whereby it is feasible to reduce the volume of data of the control signal and shorten the delay.

Specifically, in order to achieve the above object, a base station according to the present invention is a base station configured to perform radio communication based on code division multiplexing with a mobile station which transmits a preamble prior to a start of transmission/reception of data, and to transmit a pilot signal at a predetermined transmission power to the mobile station, the base station comprising: preamble receiving means for receiving the preamble spread with a spreading code according to a reception power or a signal interference ratio of the pilot signal at the mobile station, from the mobile station; first correspondence storing means storing correspondence information between the spreading code and, the reception power or the signal interference ratio of the pilot signal at the mobile station; and first determining means for determining a transmission power or a downlink transmission rate for a signal directed to the mobile station, based on the spreading code of the preamble received from the mobile station.

A mobile station according to the present invention is a mobile station configured to perform radio communication based on code division multiplexing with a base station which transmits a pilot signal at a predetermined transmission power, and to transmit a preamble to the base station prior to a start of transmission/reception of data, the mobile station comprising: first correspondence storing means for storing correspondence information between a spreading code used for the preamble, and a reception power or a signal interference ratio about the pilot signal at the mobile station; and first spreading means for spreading the preamble with the spreading code corresponding to the reception power or the signal interference ratio about the pilot signal at the mobile station, based on the said correspondence.

A communication system according to the present invention is a communication system comprising a base station configured to transmit a pilot signal at a predetermined transmission power, and a mobile station configured to transmit a preamble to the base station prior to a start of transmission/reception of data, the communication system being configured to implement radio communication based on code division multiplexing between the base station and the mobile station, wherein the mobile station comprises: first spreading means for spreading the preamble with a spreading code corresponding to a reception power or a signal interference ratio about the pilot signal at the mobile station, based on correspondence information between the spreading code used for the preamble, and the reception power or the signal interference ratio about the pilot signal at the mobile station; and preamble transmitting means for transmitting the preamble after the spreading process to the base station; and wherein the base station comprises: first rate determining means for determining a transmission power or a downlink transmission rate for a signal directed to the mobile station, according to the spreading code of the preamble received from the mobile station, based on the correspondence information between the spreading code used for the preamble, and the reception power or the signal interference ratio about the pilot signal at the mobile station.

A transmission control method according to the present invention is a transmission control method of implementing radio communication based on code division multiplexing between a base station configured to transmit a pilot signal at a predetermined transmission power and a mobile station configured to transmit a preamble to the base station prior to a start of transmission/reception of data, the transmission control method comprising: a first spreading step wherein the mobile station determines a spreading code corresponding to a reception power or a signal interference ratio about the pilot signal at the mobile station, based on correspondence information between the spreading code used for the preamble, and the reception power or the signal interference ratio about the pilot signal at the mobile station, and the mobile station spreads the preamble with the determined spreading code; a preamble transmitting step wherein the mobile station transmits the preamble after the spreading process to the base station; and a first rate determining step wherein the base station determines a transmission power or a downlink transmission rate for a signal directed to the mobile station, according to the spreading code of the preamble received from the mobile station, based on the correspondence information between the spreading code used for the preamble, and the reception power or the signal interference ratio about the pilot signal at the mobile station.

According to the invention as described above, in order for the mobile station to notify the base station of the information about the reception power or the signal interference ratio of the pilot signal from the base station, the reception power or the signal interference ratio of the pilot signal from the base station is made to uniquely correspond to the spreading code used for spreading of the preamble, and the mobile station transmits the preamble spread with the spreading code, to the base station. The base station can acquire information about the reception power or the signal interference ratio of the pilot signal at the mobile station, based on the spreading code of the received preamble and the aforementioned correspondence. This information permits the base station to determine the optimal transmission power or transmission rate to the mobile station, without need for the mobile station to separately notify the base station of the information about the reception power or signal interference ratio of the pilot signal, whereby it is feasible to reduce the volume of data of the control signal and shorten the delay. The reason is that the method of directly acquiring the information of the signal interference ratio from the spreading code is simpler in processing and shorter in the processing delay than the method of coding the data to be notified of, transmitting the coded data, decoding the data on the receiver side, and analyzing the contents thereof.

In order to achieve the above object, another base station according to the present invention is a base station configured to perform radio communication based on code division multiplexing with a mobile station which transmits a preamble prior to a start of transmission/reception of data, the base station comprising: preamble receiving means for receiving the preamble spread with a spreading code according to a preamble transmission power of the mobile station, from the mobile station; second correspondence storing means storing correspondence information between the spreading code and the preamble transmission power of the mobile station; second determining means for determining an uplink transmission rate for transmission of information from the mobile station, based on the spreading code of the preamble received from the mobile station, and a reception power or a signal interference ratio of the preamble; and rate instructing means for instructing the mobile station to use the uplink transmission rate determined.

Another mobile station according to the present invention is a mobile station configured to perform radio communication based on code division multiplexing with a base station and to transmit a preamble to the base station prior to a start of transmission/reception of data, the mobile station comprising: second correspondence storing means for storing correspondence information between a spreading code used for the preamble, and a preamble transmission power of the mobile station; and second spreading means for spreading the preamble with the spreading code corresponding to the preamble transmission power of the mobile station, based on the said correspondence.

Another communication system according to the present invention is a communication system comprising a base station, and a mobile station configured to transmit a preamble to the base station prior to a start of transmission/reception of data, the communication system being configured to implement radio communication based on code division multiplexing between the base station and the mobile station, wherein the mobile station comprises: second spreading means for spreading the preamble with a spreading code corresponding to a preamble transmission power of the mobile station, based on correspondence information between the spreading code used for the preamble, and the preamble transmission power of the mobile station; and preamble transmitting means for transmitting the preamble after the spreading process to the base station; and wherein the base station comprises: second rate determining means for determining an uplink transmission rate for transmission of information from the mobile station, according to the spreading code of the preamble received from the mobile station, and a reception power or a signal interference ratio of the preamble, based on the correspondence information between the spreading code used for the preamble, and the preamble transmission power of the mobile station; and rate instructing means for instructing the mobile station to use the uplink transmission rate-determined.

Another transmission control method according to the present invention is a transmission control method of implementing radio communication based on code division multiplexing between a base station, and a mobile station configured to transmit a preamble to the base station prior to a start of transmission/reception of data, the transmission control method comprising: a second spreading step wherein the mobile station determines a spreading code corresponding to a preamble transmission power of the mobile station, based on correspondence information between the spreading code used for the preamble, and the preamble transmission power of the mobile station, and the mobile station spreads the preamble with the determined spreading code; a preamble transmitting step wherein the mobile station transmits the preamble after the spreading process to the base station; a second rate determining step wherein the base station determines an uplink transmission rate for transmission of information from the mobile station, according to the spreading code of the preamble received from the mobile station, and a reception power or a signal interference ratio of the preamble, based on the correspondence information between the spreading code used for the preamble, and the preamble transmission power of the mobile station; and a rate instructing step wherein the base station instructs the mobile station to use the uplink transmission rate determined.

According to the invention as described above, a unique correspondence is made between the spreading code used for transmission of the preamble, and the transmission power of the preamble, the preamble is transmitted after spread with the spreading code determined based on the transmission power of the preamble and the correspondence on the occasion of transmitting the preamble from the mobile station to the base station, the base station determines the transmission power of the preamble from the spreading code of the received preamble, and the base station can calculate a propagation loss from the mobile station to the base station, based on a difference between the transmission power and the reception power of the preamble measured. This allows the base station to derive a maximum transmissible rate of the mobile station, and it becomes feasible to implement effective utilization of radio resources, without allocating the mobile station a radio resource over its potential. In the method above, the mobile station does not have to separately transmit the transmission power information of the preamble as a control signal to the base station, either, and the base station can determine the optimal transmission power or transmission rate to the mobile station, whereby it is feasible to reduce the volume of data of the control signal and shorten the delay.

Incidentally, it is also possible to adopt aspects of the invention, described below, for determining the transmission power or the downlink transmission rate for a signal directed to the mobile station, and the uplink transmission rate for transmission of information from the mobile station, by applying the above-stated invention. By the invention below, it is also feasible to reduce transmission of control information so as to decrease the volume of data of the control signal and shorten the delay.

Namely, another base station according to the present invention is a base station configured to perform radio communication based on code division multiplexing with a mobile station which transmits a preamble prior to a start of transmission/reception of data, and to transmit a pilot signal at a predetermined transmission power to the mobile station, the base station comprising: preamble receiving means for receiving the preamble spread with a spreading code according to a combination of a reception power or a signal interference ratio of the pilot signal at the mobile station, with a preamble transmission power of the mobile station, from the mobile station; third correspondence storing means storing correspondence information between the spreading code and, the combination of the reception power or the signal interference ratio of the pilot signal at the mobile station, with the preamble transmission power of the mobile station; first determining means for determining a transmission power or a downlink transmission rate for a signal directed to the mobile station, based on the spreading code of the preamble received from the mobile station; second determining means for determining an uplink transmission rate for transmission of information from the mobile station, based on the spreading code of the preamble and, the reception power or the signal interference ratio of the preamble; and rate instructing means for instructing the mobile station to use the uplink transmission rate determined.

Another mobile station according to the present invention is a mobile station configured to perform radio communication based on code division multiplexing with a base station which transmits a pilot signal at a predetermined transmission power, and to transmit a preamble to the base station prior to a start of transmission/reception of data, the mobile station comprising: third correspondence storing means for storing correspondence information between a spreading code used for the preamble, and a combination of a reception power or a signal interference ratio of the pilot signal at the mobile station with a preamble transmission power of the mobile station; and third spreading means for spreading the preamble with the spreading code corresponding to the combination of the reception power or the signal interference ratio of the pilot signal at the mobile station with the preamble transmission power of the mobile station, based on the said correspondence.

Another communication system according to the present invention is a communication system comprising a base station configured to transmit a pilot signal at a predetermined transmission power, and a mobile station configured to transmit a preamble to the base station prior to a start of transmission/reception of data, the communication system being configured to implement radio communication based on code division multiplexing between the base station and the mobile station, wherein the mobile station comprises: third spreading means for spreading the preamble with a spreading code corresponding to a combination of a reception power or a signal interference ratio of the pilot signal at the mobile station with a preamble transmission power of the mobile station, based on correspondence information between the spreading code used for the preamble, and the combination of the reception power or the signal interference ratio of the pilot signal at the mobile station with the preamble transmission power of the mobile station; and preamble transmitting means for transmitting the preamble after the spreading process to the base station; and wherein the base station comprises: first determining means for determining a transmission power or a downlink transmission rate for a signal directed to the mobile station, according to the spreading code of the preamble received from the mobile station, based on the correspondence information between the spreading code and, the combination of the reception power or the signal interference ratio of the pilot signal at the mobile station with the preamble transmission power of the mobile station; second determining means for determining an uplink transmission rate for transmission of information from the mobile station, based on the spreading code of the preamble, and a reception power or a signal interference ratio of the preamble; and rate instructing means for instructing the mobile station to use the uplink transmission rate determined.

Another transmission control method according to the present invention is a transmission control method of implementing radio communication based on code division multiplexing between a base station configured to transmit a pilot signal at a predetermined transmission power and a mobile station configured to transmit a preamble to the base station prior to a start of transmission/reception of data, the transmission control method comprising: a third spreading step wherein the mobile station determines a spreading code corresponding to a combination of a reception power or a signal interference ratio of a pilot signal at the mobile station with a preamble transmission power of the mobile station, based on correspondence information between the spreading code used for the preamble, and the combination of the reception power or the signal interference ratio of the pilot signal at the mobile station with the preamble transmission power of the mobile station, and the mobile station spreads the preamble with the spreading code determined; a preamble transmitting step wherein the mobile station transmits the preamble after the spreading process to the base station; a third rate determining step wherein the base station determines a transmission power or a downlink transmission rate for a signal directed to the mobile station, according to the spreading code of the preamble received from the mobile station, based on the correspondence information between the spreading code used for the preamble, and the combination of the reception power or the signal interference ratio of the pilot signal at the mobile station with the preamble transmission power of the mobile station, and the base station determines an uplink transmission rate for transmission of information from the mobile station according to the spreading code of the preamble and a reception power or a signal interference ratio of the preamble; and a rate instructing step wherein the base station instructs the mobile station to use the uplink transmission rate determined.

Incidentally, the base station is preferably configured in the following configuration: the base station as described above further comprises first setting means for setting a number ranks of preamble transmission powers of the mobile station corresponding to spreading codes used for the preamble, according to a number of ranks of uplink transmission rates determined, and for setting a difference between ranks of transmission powers according to a difference between transmission powers caused by a difference between ranks of uplink transmission rates.

In the base station, preferably, areas corresponding to respective ranks of preamble transmission powers in a cell are set so that numbers of mobile stations in the respective areas become substantially equal according to a distribution of mobile stations in the cell.

A mobile station control program according to the present invention is a mobile station control program to be executed by a computer provided in a mobile station configured to perform radio communication based on code division multiplexing with a base station which transmits a pilot signal at a predetermined transmission power, and to transmit a preamble to the base station prior to a start of transmission/reception of data, the mobile station storing correspondence information between a spreading code used for the preamble, and a reception power or a signal interference ratio of the pilot signal at the mobile station, correspondence information between the spreading code and a preamble transmission power of the mobile station, or correspondence information between the spreading code, and a combination of a reception power or a signal interference ratio of the pilot signal at the mobile station with a preamble transmission power of the mobile station, the mobile station control program comprising: a spreading step of spreading the preamble with the spreading code corresponding to the reception power or the signal interference ratio of the pilot signal at the mobile station, the preamble transmission power of the mobile station, or the combination of the reception power or the signal interference ratio of the pilot signal at the mobile station with the preamble transmission power of the mobile station, based on the correspondence information stored; and a transmitting step of transmitting the preamble after the spreading step to the base station.

BRIEF DESCRIPTION OF THE DRAWINGS

FIG. 10 is a table showing a relation between SINR ranks of downlink pilot channel and transmission parameters of data packet.

FIG. 11 is a table showing a correspondence between uplink propagation loss ranks and maximum possible transmission rates of the mobile station.

FIG. 12 is a table showing a correspondence between propagation losses of the pilot signal and initial transmission powers of the preamble.

FIG. 13 is a table showing the first half of the conversion table example among signal interference ratios (SINR) of the pilot channel (CPICH) received at the mobile station, transmission powers of the preamble, and spreading codes for transmission.

FIG. 14 is a table showing the second half of the conversion table example among signal interference ratios (SINR) of the pilot channel (CPICH) received at the mobile station, transmission powers of the preamble, and spreading codes for transmission.

FIG. 15 is a table showing a correspondence between SINR ranks of the pilot signal and spreading codes of the preamble.

FIG. 16 is a table showing a correspondence between transmission powers of the preamble and spreading codes for the preamble.

FIG. 17 is a table showing a relation between propagation loss ranges of the pilot signal and initial transmission power ranges of the preamble.

DESCRIPTION OF THE PREFERRED EMBODIMENTS

Figure 1:
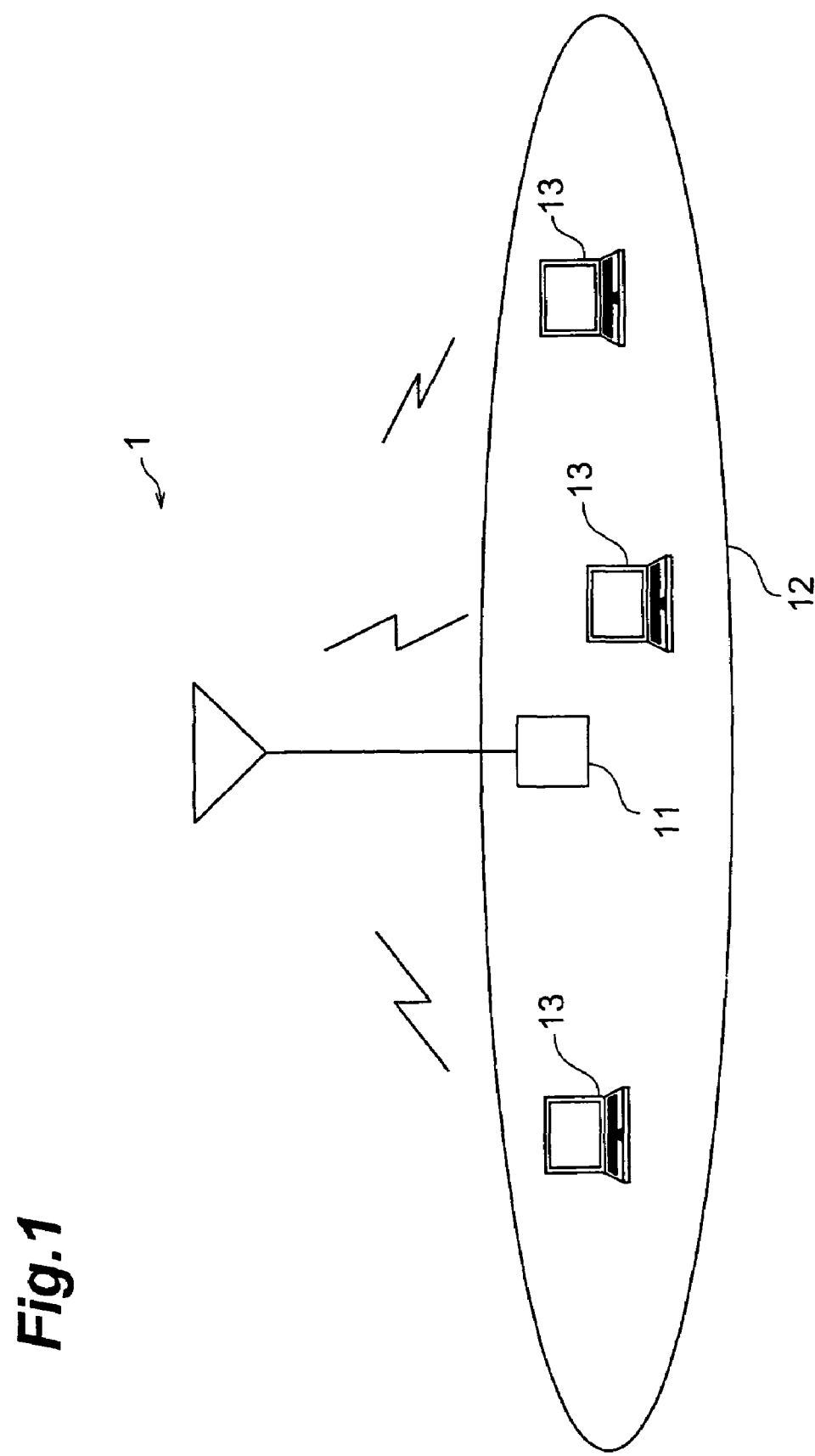
FIG. 1 is a configuration diagram of a communication system according to an embodiment of the present invention.

Embodiments of the present invention will be described below. FIG. 1 shows the schematic configuration of communication system 1 according to the present embodiment. As shown in this FIG. 1, the communication system 1 of the present embodiment contains a plurality of mobile stations 13 present in a cell 12 established by a base station 11, packets are transmitted and received between each mobile station 13 and the base station 11, and the packets are assumed to be transmitted based on code division multiplexing on a wireless zone.

First, the scheme of communication will be described, while briefly describing the relation of a spreading code used in transmission of a preamble, with a combination pattern of a received signal to interference ratio (received SINR) at each mobile station of a pilot signal and a transmission power of a preamble from the mobile station.

A method of classifying transmission rates under a plurality of ranks and selecting a maximum possible transmission rate in a certain propagation situation (a received SINR or reception power) is dominant in maximizing the system throughput, and increase in the number of ranks of transmission rates enables finer control of communication rates but makes the control more complex in allocation of resources. For this reason, the number of ranks of transmission rates is determined based on a balance between complexity and performance of the system. For example, WLAN802.11b offers four ranks, and 3.5G HSDPA offers 32 ranks.

The present example will describe a case where, as shown in FIG. 10, downlink transmission rates are classified under seven ranks for transmission by SINR ranks of the pilot signal in the downward direction (from the base station to the mobile station), and where, as shown in FIG. 11, maximum possible uplink transmission rates are classified under six ranks for transmission by propagation losses in the upward direction (from the mobile station to the base station). Here FIG. 10 shows a relation between SINR (or CQI) ranks of the downlink pilot signal measured where the transmission power of data packet and the transmission power of pilot channel are fixed and where the received SINR of pilot channel is 2 dB greater than the received SINR of data packet, and transmission parameters (transmission rates) used upon transmission of data. FIG. 11 shows a relation between propagation losses between the mobile station and the base station, and maximum possible transmission rates of the mobile station (in a case where the maximum transmission power is fixed at 24 dBm and where maximum possible transmission rates of the mobile station are classified under six ranks).

There is the downlink pilot channel in the example below, but even if there is no pilot channel, a determination on the received SINR of a data packet in a case where the transmission power of data packet is fixed, provides the same effect as a determination on the received SINR of the pilot channel.

In order to prevent excessive interference with other users, the initial transmission power of the uplink preamble is determined by a propagation loss of the downlink pilot signal. Since the transmission power of the pilot signal is notified of herein, a downlink propagation loss is calculated from a difference between the transmission and reception powers, an approximate range of uplink propagation loss is estimated from the downlink propagation loss value, and an initial transmission power of the preamble is determined so as to keep constant the reception power at the base station.

In the present example, as shown in FIG. 12, it is assumed that the maximum propagation loss in the cell is 142 dB and that when the propagation loss in the cell is 142 dB, the mobile station transmits the preamble at the maximum transmission power of 24 dBm, and a rank of the initial transmission power of the preamble is set according to a rank of a propagation loss so as to keep the reception power of the preamble constant (e.g., 118 dBm) at the base station. Where different frequencies are used between downlinks and uplinks, variations of fading are different, and there thus occurs some difference (e.g., −9 dB to 9 dB) between uplink and downlink propagation losses. Therefore, there can occur a case where the preamble transmitted at the initial transmission power fails to reach the base station. In this case, the transmission power of the preamble is increased by a certain value (e.g., 1 dB) from the previous transmission power and the preamble is again transmitted. The above transmission of the preamble is repeated until the mobile station receives an acknowledgment from the base station or until the number of retransmissions reach a maximum number. A spreading code for the transmission of the preamble is determined based on the transmission power rank upon the transmission of the preamble and the SINR rank of the downlink pilot signal as shown in FIGS. 13 and 14. FIG. 13 shows the first half of a conversion table example among signal interference ratios (SINRs) of the pilot channel (CPICH) received at the mobile station, preamble transmission powers, and spreading codes for transmission, and FIG. 14 the second half of the same conversion table example.

Figure 2:
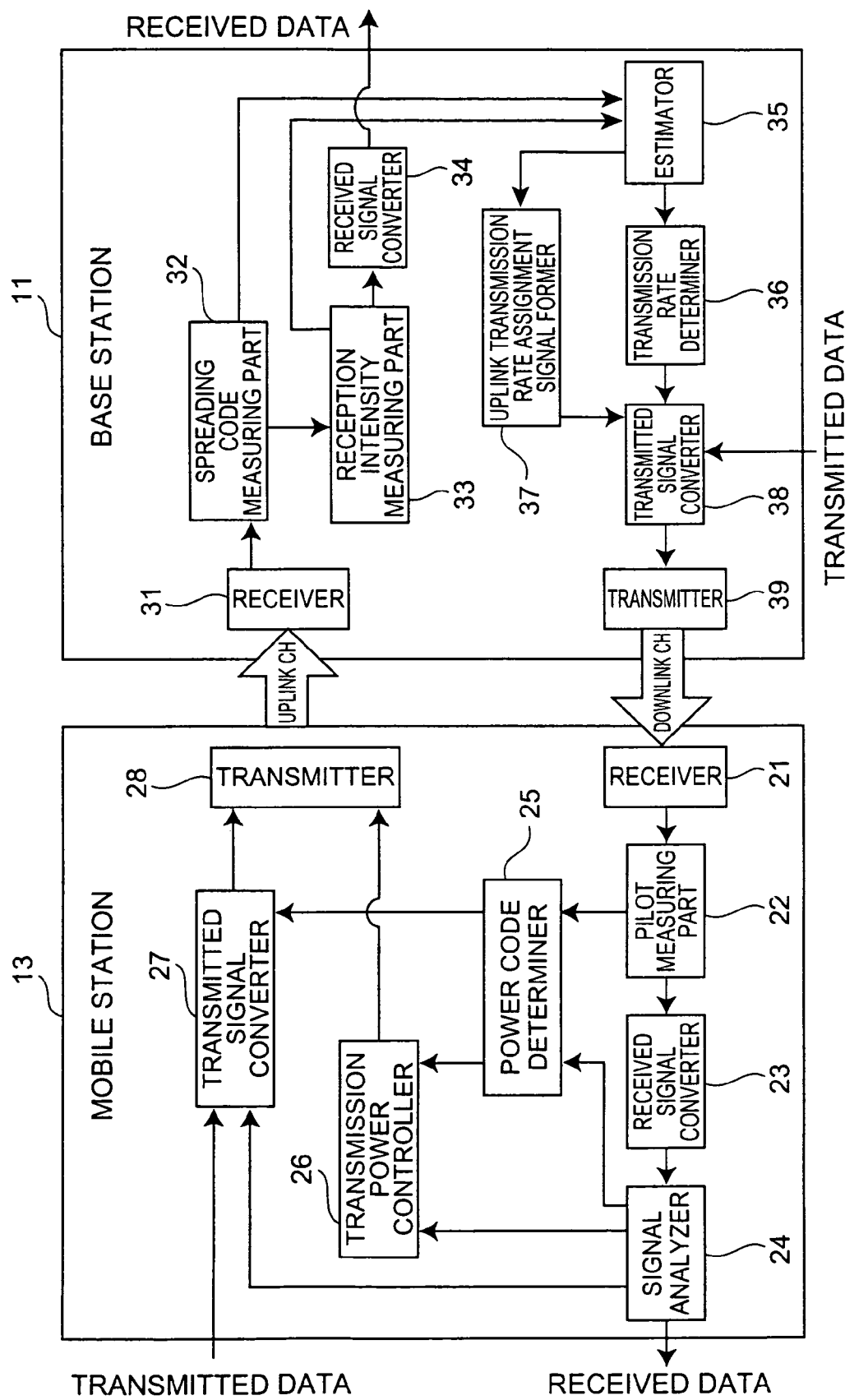
FIG. 2 is a functional block diagram showing configurations of a mobile station and a base station.

The configurations of base station 11 and mobile station 13 will be detailed below. FIG. 2 shows the internal configurations of base station 11 and mobile station 13 according to the present embodiment.

As shown in FIG. 2, a mobile station 13 has receiver 21, pilot measuring part 22, received signal converter 23, signal analyzer 24, power code determiner 25, transmission power controller 26, transmitted signal converter 27, and transmitter 28.

Among these parts, the receiver 21 is a circuit for receiving a signal of the pilot channel, a paging signal, an assignment signal, a connect signal, data packets, etc. transmitted from transmitter 39 of base station 11 through a radio communication line, and a received signal is subjected to measurement of a signal interference ratio (SINR) of the pilot channel and a reception power of the pilot channel by the pilot measuring part 22 and thereafter fed to received signal converter 23.

The pilot measuring part 22 measures the SINR and reception power of the pilot channel from the base station from which the pilot signal was received, and feeds the results thereof to power code determiner 25 and the received signal to received signal converter 23.

The power code determiner 25 determines a transmission power of the preamble and a spreading code for transmission of the preamble. Specifically, where there arises transmitted data or where a paging signal from the base station to the mobile station is detected at signal analyzer 24, the power code determiner 25 calculates a propagation loss of the pilot channel from a difference between the reception power of the pilot channel from the pilot measuring part 22 and the transmission power of the pilot channel stored (a fixed value or a value notified of by the base station), and determines an initial transmission power of the preamble from the correspondence between propagation losses of the pilot signal and initial transmission powers of the preamble shown in FIG. 12. Then the power code determiner 25 determines a spreading code number for transmission of the preamble, based on the transmission power, the information about the SINR of the pilot channel from the pilot measuring part 22, and the unique correspondence among values of SINR of the pilot channel, transmission powers of the preamble, and spreading code numbers for transmission of the preamble as shown in FIGS. 13 and 14, and outputs the information about the initial transmission power thus determined, to the transmission power controller 26 and the spreading code for transmission of the preamble to the transmitted signal converter 27, respectively.

When receiving no acknowledgment from the base station even after a lapse of a fixed time (e.g., 3 ms) since transmission of the preamble, the power code determiner 25 increases the transmission power of the preamble by a fixed value (e.g., 1 dB), determines another spreading code for transmission of the preamble, based on the transmission power at this time, the SINR value of the pilot signal updated, and the unique correspondence among values of SINR of the pilot channel, transmission powers of the preamble, and spreading code numbers for transmission of the preamble as shown in FIGS. 13 and 14, and outputs the information about the determined transmission power to transmission power controller 26 and the spreading code for transmission of the preamble to the transmitted signal converter 27, respectively. Then the power code determiner 25 terminates transmission of the preamble after the signal analyzer 24 confirms reception of an acknowledgment from the base station.

The transmitted signal converter 27 and the received signal converter 23 are circuits for converting data to be transmitted or received, into a predetermined signal. Among these, the transmitted signal converter 27 spreads the preamble signal with the spreading code for transmission of the preamble notified of by the power code determiner 25, performs other necessary operations, and then outputs the preamble signal to the transmitter 28. The transmitted signal converter 27 also determines a spreading rate, a modulation method, a coding rate, etc. for transmission on the basis of an assignment signal (containing a transmission rate assigned) from the base station through analysis at the signal analyzer 24, performs coding, spreading, and modulation processes of transmitted data, and outputs the resultant data to the transmitter 28. On the other hand, the received signal converter 23 performs demodulation, despreading, and decoding processes for a received signal fed via the pilot measuring part 22, and outputs the signal after the processes to the signal analyzer 24.

The signal analyzer 24 is a circuit for analyzing a received signal after the conversion at the received signal converter 23 and for outputting the result of the analysis, depending upon a type of the received signal, as follows. Namely, the signal analyzer 24 outputs information about a transmission rate assigned to a data packet, received from the base station 11, to transmitted signal converter 27, outputs the transmission power information calculated based on the transmission rate received from the base station 11, to transmission power controller 26, and outputs a data packet received. When receiving an assignment signal or a connect signal from base station 11, the signal analyzer 24 instructs the power code determiner 25 to terminate the transmission of the preamble.

The transmission power controller 26 is a circuit for controlling a transmission power of a signal transmitted at the transmitter 28, and the transmission power controller 26 controls the transmission power of the preamble on the basis of the information about the transmission power of the preamble from the power code determiner 25 and controls the transmission power of data packet on the basis of the information about the transmission power of data packet from the signal analyzer.

The transmitter 28 is a circuit for transmitting a signal through a radio communication line to receiver 31 of base station 11. The transmitter 28 transmits the signal after the conversion at transmitted signal converter 27. This transmitter 28 transmits the signal after the conversion at transmitted signal converter 27, at a transmission power set by the transmission power controller 26.

In the present embodiment, a packet data transmitter for carrying out the transmitting operation of packet data is comprised of the signal analyzer 24, transmission power controller 26, transmitted signal converter 27, and transmitter 28. In this packet data transmitter, the signal analyzer 24 determines a transmission power and a transmission parameter on the basis of the information about the transmission rate determined based on the preamble at the base station 11, and the transmitted signal converter 27 forms a signal with the determined transmission parameter. The transmission power controller 26 controls the transmission power at the determined transmission power and the transmitter 28 performs the transmission of packet data under control of the transmission power controller 26.

In the present embodiment, a preamble transmitter for performing the preamble transmission operation is comprised of the pilot measuring part 22, power code determiner 25, transmission power controller 26, transmitted signal converter 27, and transmitter 28. The preamble transmitter performs the transmission of the preamble, using a spreading code corresponding in FIGS. 13 and 14 to the measured rank of SINR of the pilot channel from the base station 11 or to the transmission power rank of the preamble.

On the other hand, the base station 11 has receiver 31, spreading code measuring part 32, reception intensity measuring part 33, received signal converter 34, estimator 35, transmission rate determiner 36, uplink transmission rate assignment signal former 37, transmitted signal converter 38, and transmitter 39.

Among these, the receiver 31 is a circuit for receiving a signal from mobile station 13 through a radio communication line, and a received signal is outputted via spreading code measuring part 32 and reception intensity measuring part 33 to received signal converter 34. The transmitter 39 transmits various signals through a radio communication line to receiver 21 of mobile station 13.

The spreading code measuring part 32 always performs detection of a predetermined preamble-dedicated spreading code (e.g., forty two preamble-dedicated spreading codes as shown in FIGS. 13 and 14) from a received signal from receiver 31, and, when detecting a preamble, it notifies the reception intensity measuring part 33 and estimator 35 of the reception of the preamble signal and a number of the spreading code.

When receiving the notification of the reception of the preamble from spreading code measuring part 32, the reception intensity measuring part 33 measures a reception power intensity of the preamble signal with the spreading code notified of, outputs the result to the estimator 35, and transfers the received data to received signal converter 34 as it is.

The estimator 35 estimates a transmission power rank of the preamble and an SINR rank of the pilot channel measured at the mobile station, based on the spreading code of the preamble signal notified of by the spreading code measuring part 32 and based on the stored unique correspondence of combinations among spreading codes, preamble transmission powers, and SINR ranks of the pilot channel measured at the mobile station, shown in FIGS. 13 and 14, calculates a propagation loss rank in transmission from the mobile station to the base station, based on a difference between the transmission power rank of the preamble thus estimated and the reception power intensity of the preamble notified of by reception intensity measuring part 33, notifies the uplink transmission rate assignment signal former 37 of the propagation loss rank, and further notifies the transmission rate determiner 36 of the rank of SINR of the pilot channel.

The transmission rate determiner 36 determines a transmission parameter of data packet, based on the SINR rank of the pilot channel notified of by estimator 35 and based on the stored relation between SINR ranks of the downlink pilot channel and transmission parameters of data packet shown in FIG. 10, and notifies the transmitted signal converter 38 of the determined transmission parameter.

The uplink transmission rate assignment signal former 37 determines a maximum possible transmission rate of the mobile station, based on the uplink propagation loss rank notified of by estimator 35 and based on the stored relation between uplink propagation loss ranks and maximum possible transmission rates of the mobile station shown in FIG. 11, assigns a transmission rate of the mobile station within a range not exceeding the maximum possible transmission rate, and outputs an assignment signal to transmitted signal converter 38.

The transmitted signal converter 38 and received signal converter 34 are circuits for converting a signal to be transmitted or received, into a predetermined signal format. The transmitted signal converter 38 performs coding, modulation, and spreading of transmitted data and transmits the data with the transmission parameter determined by transmission rate determiner 36, to mobile station 13, and upon reception of a signal, the received signal converter 34 performs despreading, demodulation, and decoding of received data and then outputs the data.

Control procedures at the base station and at the mobile station will be described below in application of the proposed system. At first, the first transmission control method shown in FIGS. 3 and 4 will be described.

First, the control procedure at the base station will be described on the basis of FIG. 3. When the base station is started up (S101), the base station is first made to store the table of FIGS. 13 and 14 indicating the correspondence among SINR ranks of the pilot signal, transmission power ranks of the preamble, and spreading codes of the preamble, the table of FIG. 10 indicating the relation between SINR ranks of the pilot signal and downlink transmission parameters, and the table of FIG. 11 indicating the relation between uplink propagation loss ranks and maximum possible transmission rates of the mobile station (S102). Then the base station awaits reception of the preamble from the mobile station (S103) or occurrence of transmitted data to the mobile station (S106).

When the preamble is detected herein (with yes at S103), the base station records a reception power of the preamble and retrieves a corresponding transmission power of the preamble from the table of FIGS. 13 and 14, using the spreading code for transmission of the preamble as a key (S104). Then the base station calculates a propagation loss from the difference between the corresponding transmission power and the reception power of the preamble recorded, and calculates a maximum possible transmission rate of the mobile station on the basis of the uplink propagation loss from FIG. 11 (S105). Then the base station determines a transmission rate of the mobile station within a range not exceeding the maximum possible transmission rate, notifies the mobile station of the transmission rate by an assignment signal, and allocates a resource according to the transmission rate (S111).

On the other hand, when there arises transmitted data to the mobile station (with yes at S106), the base station transmits a paging signal to the mobile station (S107) and awaits the preamble from the mobile station (S108). When the base station detects the preamble from the mobile station (with yes at S108), it then retrieves a corresponding SINR of the pilot channel from the table of FIGS. 13 and 14, using the spreading code for transmission of the preamble as a key (S109); and it determines a transmission parameter of data packet from the table of FIG. 10, using the SINR of the pilot channel as a key, and performs the transmission of packet with the determined transmission parameter (S110).

The control procedure at the mobile station will be described below on the basis of FIG. 4.

When the mobile station is put in (S201), the mobile station is first made to store the table of FIG. 12 indicating the relation between propagation losses of the pilot channel and initial transmission powers of the preamble, and the table of FIGS. 13 and 14 indicating the correspondence among SINR ranks of the pilot channel, transmission powers of the preamble, and spreading codes of the preamble (S202). Then the mobile station awaits occurrence of transmitted data (S203) or paging from the base station (S210).

When there arises transmitted data herein (with yes at S203), the mobile station determines an initial transmission power of the preamble from the table of FIG. 12, using the reception intensity of the pilot channel from the base station as a key (S204). Then the mobile station determines a spreading code for transmission of the preamble from the table of FIGS. 13 and 14, using the transmission power of the preamble as a key (S205), and performs the transmission of the preamble with the determined spreading code (S206). Then the mobile station awaits reception of an assignment signal (information about a transmission rate) for a predetermined time after the transmission of the preamble (S207). When receiving an assignment signal within the predetermined time herein, the mobile station transmits a packet on the basis of the assigned transmission rate (S209) and thereafter returns into the transmitted data awaiting state (S203). On the other hand, when receiving no assignment signal within the predetermined period at S207, the mobile station increases the transmission power of the preamble by a fixed value (S208) and thereafter again performs the transmission of the preamble while selecting a spreading code from the table of FIGS. 13 and 14, using the new transmission power as a key (S205 and S206).

When paged by the base station at S210 (with yes at S210), the mobile station measures the SINR of the pilot channel from the base station (S211) and determines a spreading code for transmission of the preamble from the table of FIGS. 13 and 14, using the SINR value obtained by the measurement, as a key (S212). Then the mobile station transmits the preamble with the determined spreading code (S213). Then the mobile station awaits reception of a connect signal for a predetermined time after the transmission of the preamble (S214). When receiving a connect signal within the predetermined time herein (with yes at S214), the mobile station establishes a connection link to receive a packet from the base station (S216). On the other hand, when receiving no connect signal within the predetermined time at S214 (with no at S214), the mobile station increases the transmission power of the preamble by a fixed value (S215) and thereafter again measures the SINR of the pilot channel from the base station (S211). Then the mobile station determines a spreading code of the preamble in accordance with the measured value of SINR (S212) and then transmits the preamble with the determined spreading code (S213).

Figure 3:
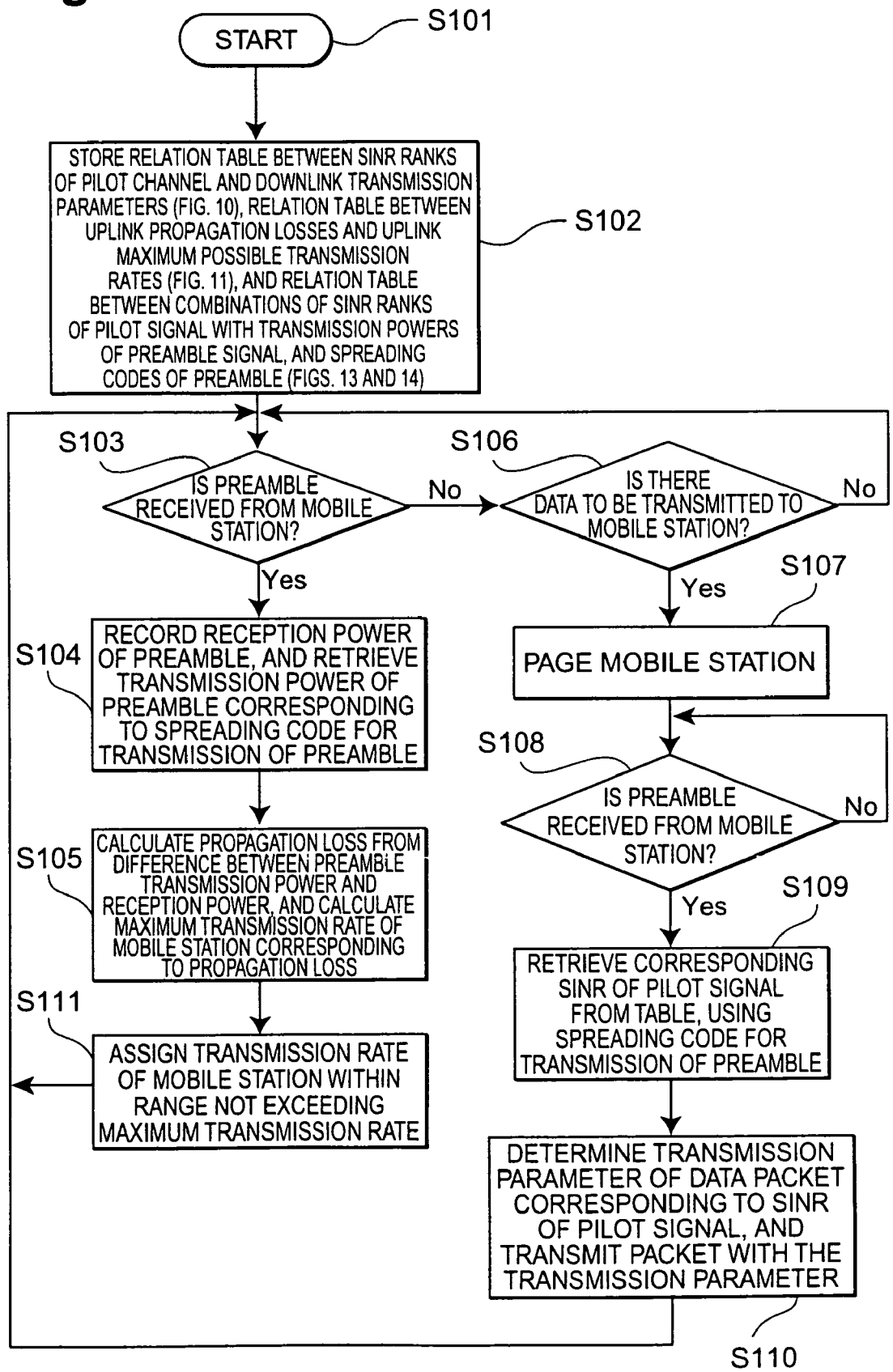
FIG. 3 is a flowchart showing processing at the base station according to the first transmission control method.
Figure 4:
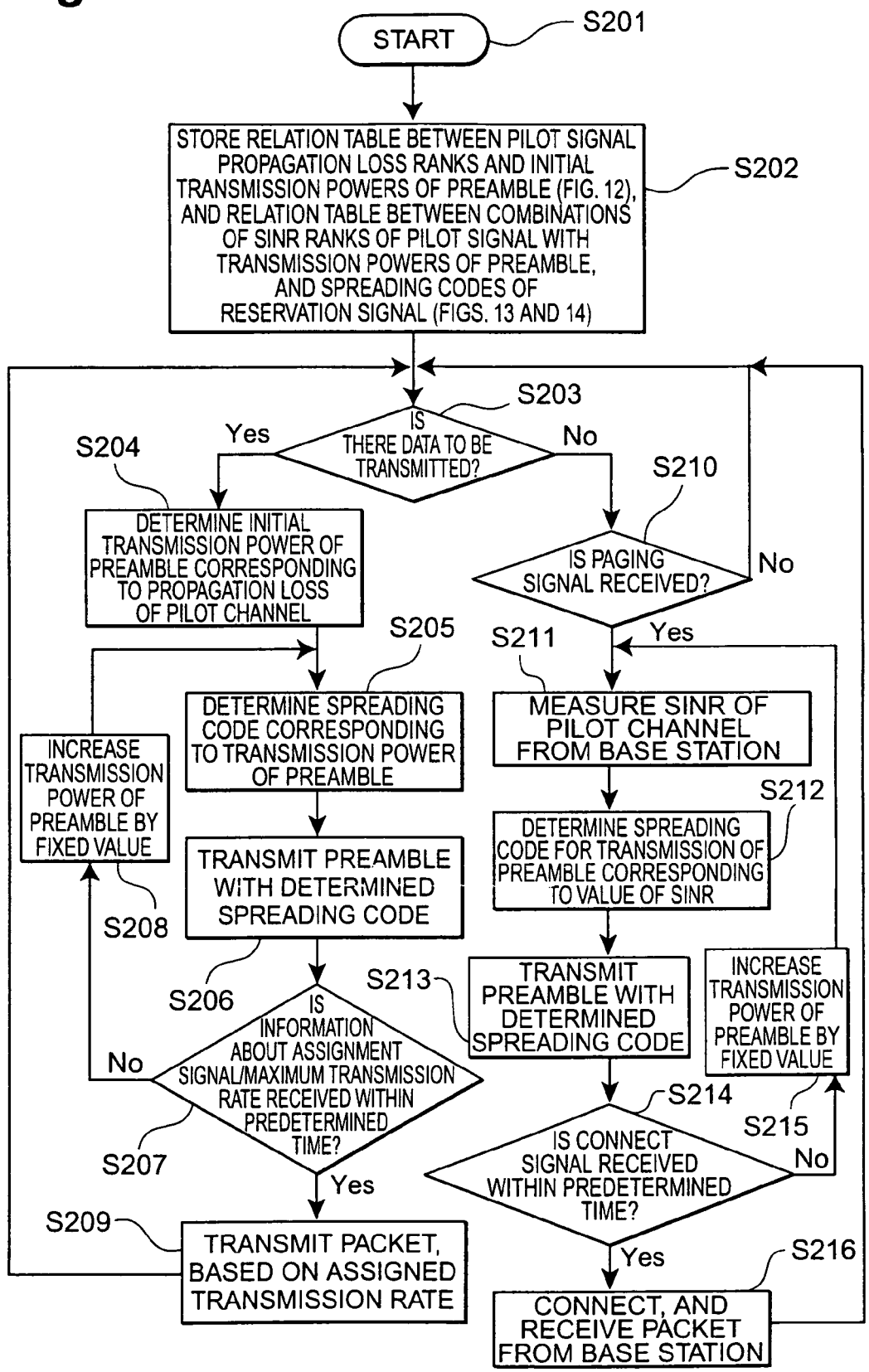
FIG. 4 is a flowchart showing processing at the mobile station according to the first transmission control method.

As described above, in order for the mobile station to notify the base station of the SINR information of the pilot signal therefrom by the processings of FIGS. 3 and 4, the SINR rank of the pilot signal from the base station is made uniquely corresponding to a spreading code used for spreading of the preamble, and the mobile station transmits the preamble spread with the spreading code, to the base station. The base station can acquire the SINR information of the pilot signal at the mobile station, based on the spreading code of the received preamble and the aforementioned correspondence. Based on this SINR information, the base station can determine the optimal transmission power or transmission rate to the mobile station, without need for the mobile station to separately notify the base station of the SINR information of the pilot signal, whereby it is feasible to reduce the volume of data of the control signal and shorten the delay.

On the occasion of making a spreading code used in transmission of the preamble, uniquely corresponding to a rank of transmission power of the preamble and transmitting the preamble from the mobile station to the base station, the mobile station spreads the preamble with the spreading code for transmission determined by the rank of the transmission power of the preamble and the aforementioned correlation and then transmits the preamble; and the base station can determine the rank of the transmission power of the preamble from the spreading code for transmission of the received preamble and calculate a propagation loss from the mobile station to the base station from the difference between the transmission power and the reception power of the preamble measured. This permits the base station to derive a maximum transmissible rate of the mobile station and it becomes feasible to implement effective utilization of radio resources, without allocating the mobile station a radio resource over its potential.

Incidentally, the aforementioned processing example of FIGS. 3 and 4 corresponds to the first transmission control method (using both of the second transmission control method and the third transmission control method). The second transmission control method shown in FIGS. 5 and 6, and the third transmission control method shown in FIGS. 7 and 8 will be described below in order.

First, the control procedure at the base station based on FIG. 5 will be described. When the base station is started up (S101), the base station is first made to store the table of FIG. 15 indicating the correspondence between SINR ranks of the pilot signal and spreading codes of the preamble and the table of FIG. 10 indicating the relation between SINR ranks of the pilot signal and downlink transmission parameters (S102). Then the base station awaits occurrence of transmitted data to the mobile station (S106).

Thereafter, when there arises transmitted data to the mobile station (with yes at S106), the base station transmits a paging signal to the mobile station (S107) and awaits the preamble from the mobile station (S108). When the base station detects the preamble from the mobile station (with yes at S108), the base station retrieves a corresponding SINR of the pilot channel from the table of FIG. 15, using the spreading code for transmission of the preamble as a key (S109), and then the base station determines a transmission parameter of data packet from the table of FIG. 10, using the SINR of the pilot channel as a key, and performs the transmission of packet with the determined transmission parameter (S110).

The control procedure at the mobile station based on FIG. 6 will be described next. When the mobile station is put in (S201), the mobile station is first made to store the table of FIGS. 13 and 14 indicating the correspondence among SINR ranks of the pilot channel, transmission powers of the preamble, and spreading codes of the preamble (S202). Then the mobile station awaits paging from the base station (S210).

Thereafter, when the mobile station is paged by the base station at S210 (with yes at S210), the mobile station measures an SINR of the pilot channel from the base station (S211), determines a spreading code for transmission of the preamble from the table of FIGS. 13 and 14, using the SINR value obtained by the measurement, as a key (S212), and then transmits the preamble with the determined spreading code (S213). Then the mobile station awaits reception of a connect signal for a predetermined time after the transmission of the preamble (S214). When the mobile station receives a connect signal within the predetermined time herein (with yes at S214), the mobile station establishes a connection link with the base station to receive a packet from the base station (S216). On the other hand, when the mobile station receives no connect signal within the predetermined time at S214 (with no at S214), the mobile station increases the transmission power of the preamble by a fixed value (S215) and thereafter again measures an SINR of the pilot channel from the base station (S211). Then the mobile station determines a spreading code of the preamble in accordance with the measured value of SINR (S212) and then transmits the preamble with the determined spreading code (S213).

The control procedure at the base station based on FIG. 7 will be described next. When the base station is started up (S101), the base station is first made to store the table of FIG. 11 indicating the relation between uplink propagation loss ranks and maximum possible transmission rates of the mobile station and the table of FIG. 16 indicating the correspondence between transmission powers of the preamble and spreading codes of the preamble (S102). Then the base station awaits reception of the preamble from the mobile station (S103).

When the base station detects the preamble herein (with yes at S103), the base station records a reception power of the preamble and retrieves a corresponding transmission power of the preamble from the table of FIG. 16, using a spreading code for transmission of the preamble as a key (S104). Then the base station calculates a propagation loss from the difference between the corresponding transmission power and the recorded reception power of the preamble and calculates a maximum possible transmission rate of the mobile station with the uplink propagation loss from FIG. 11 (S105). Then the base station determines a transmission rate of the mobile station within the range not exceeding the maximum possible transmission rate, notifies the mobile station of the transmission rate by an assignment signal, and allocates a resource according to the transmission rate (S111).

The control procedure at the mobile station based on FIG. 8 will be described next. When the mobile station is put in (S201), the mobile station is first made to store the table of FIG. 12 indicating the relation between propagation losses of the pilot channel and initial transmission powers of the preamble and the table of FIG. 16 indicating the correspondence between transmission powers of the preamble and spreading codes of the preamble (S202). Then the mobile station awaits occurrence of transmitted data (S203).

When there arises transmitted data herein (with yes at S203), the mobile station determines an initial transmission power of the preamble from the table of FIG. 12, using a reception intensity of the pilot channel from the base station as a key (S204), determines a spreading code for transmission of the preamble from the table of FIG. 16, using the transmission power of the preamble as a key (S205), and then performs the transmission of the preamble with the determined spreading code (S206). Then the mobile station awaits reception of an assignment signal (information about a transmission rate) for a predetermined time after the transmission of the preamble (S207). When the mobile station receives an assignment signal within the predetermined time herein, it transmits a packet on the basis of the assigned transmission rate (S209) and thereafter returns into the transmitted data awaiting state (S203). On the other hand, when the mobile station receives no assignment signal within the predetermined time at S207, it increases the transmission power of the preamble by a fixed value (S208), and thereafter it again selects a spreading code from the table of FIG. 16, using the new transmission power as a key, and then performs transmission of the preamble (S205 and S206).

Figure 5:
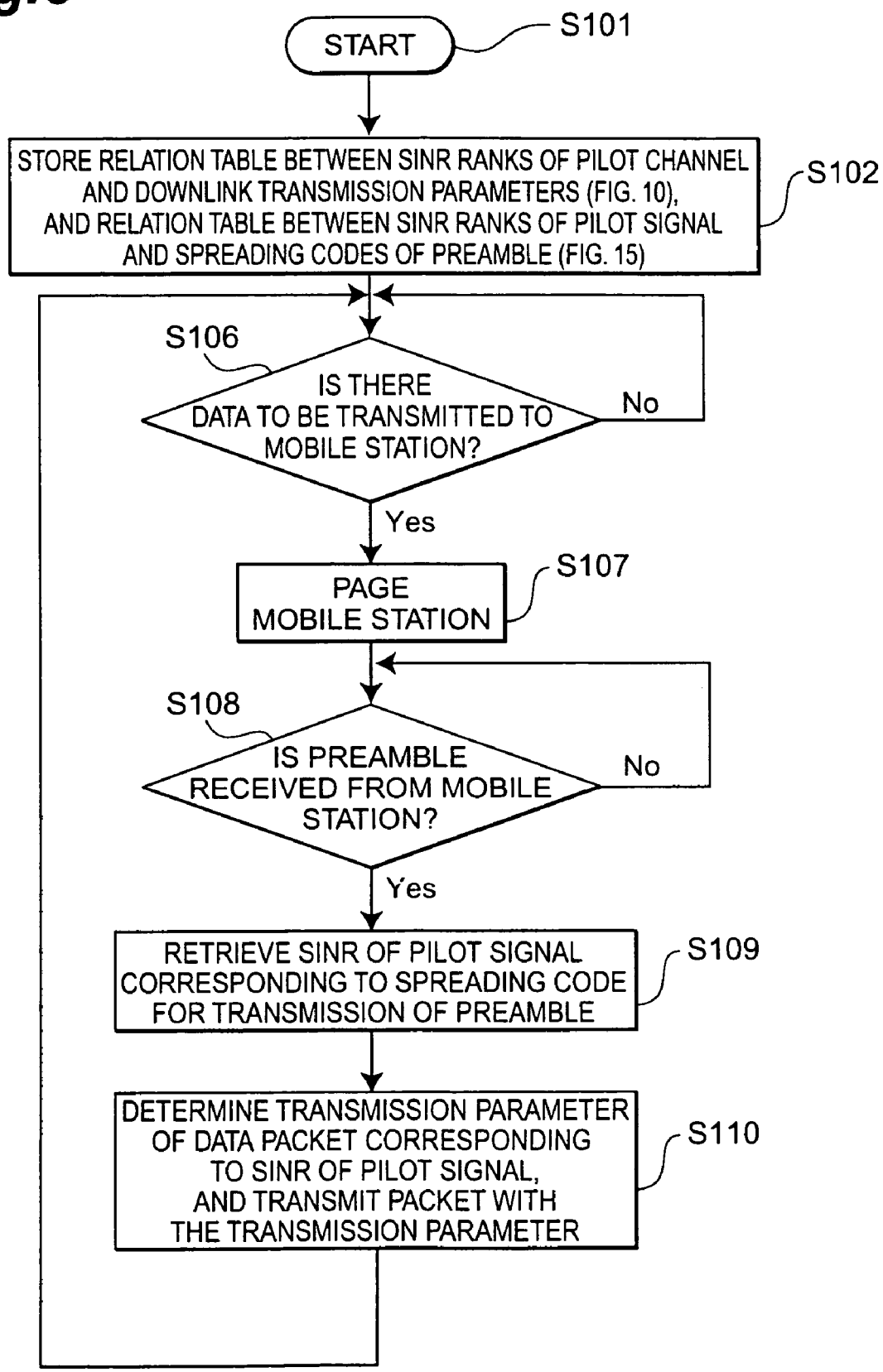
FIG. 5 is a flowchart showing processing at the base station according to the second transmission control method.
Figure 6:
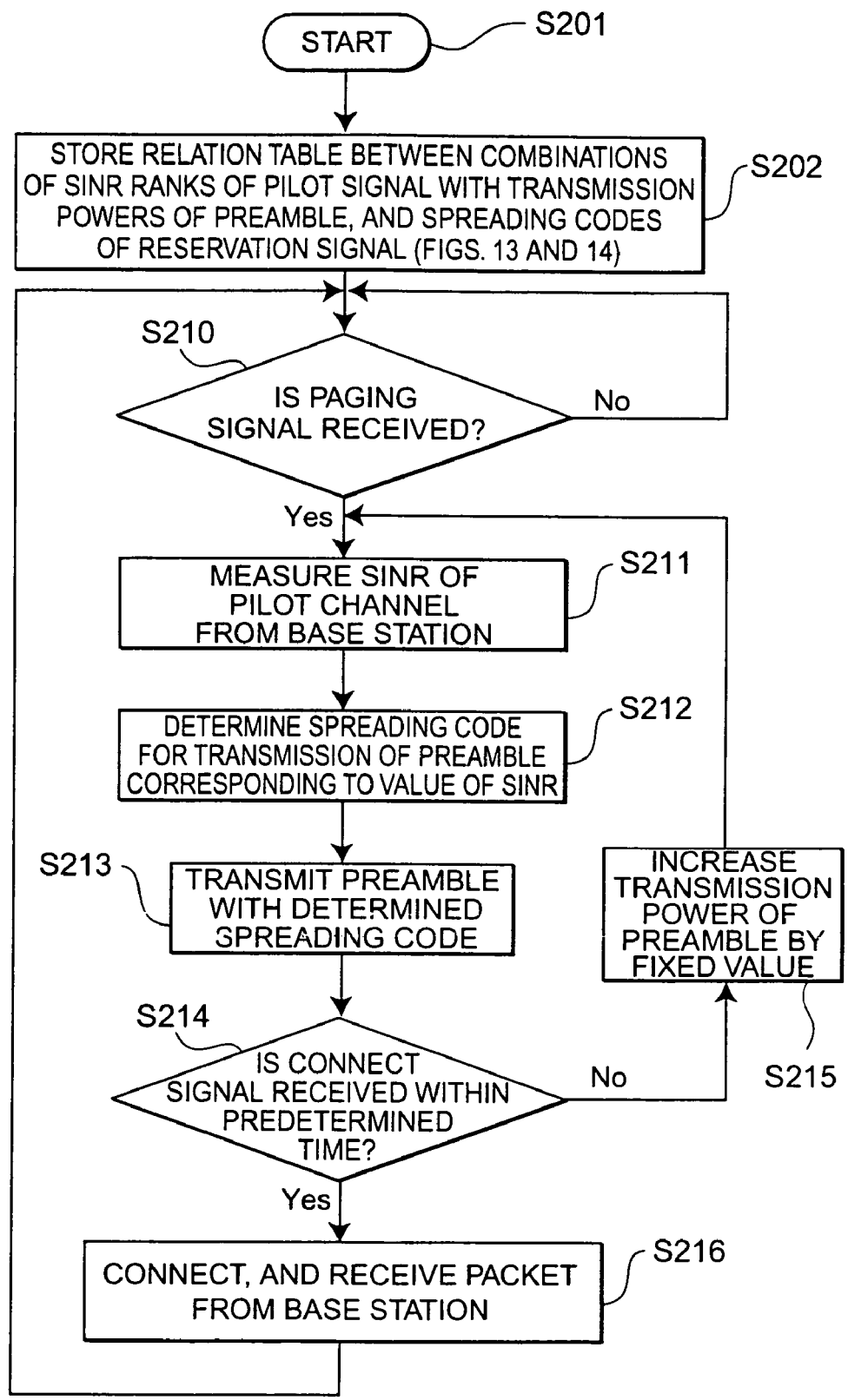
FIG. 6 is a flowchart showing processing at the mobile station according to the second transmission control method.
Figure 7:
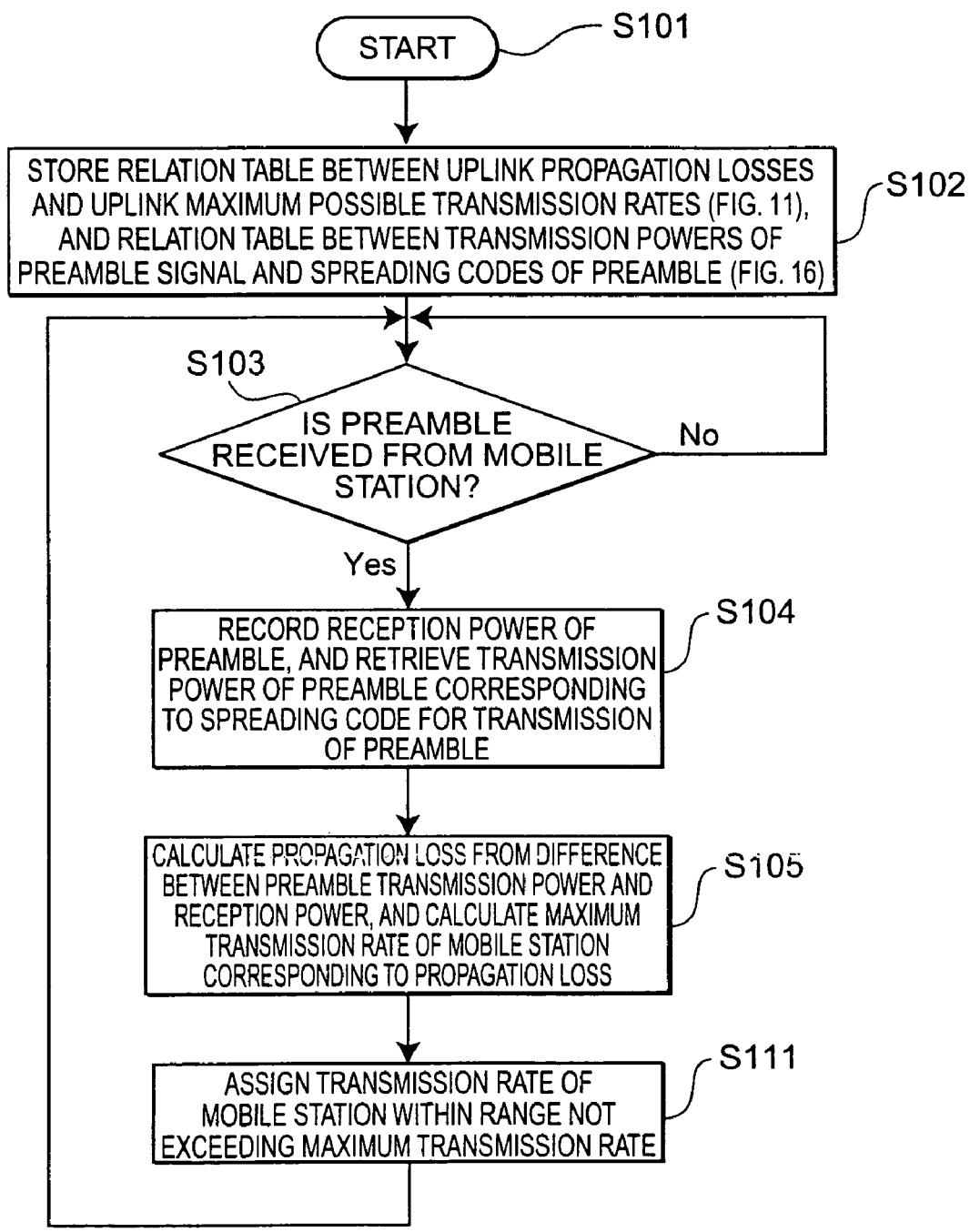
FIG. 7 is a flowchart showing processing at the base station according to the third transmission control method.
Figure 8:
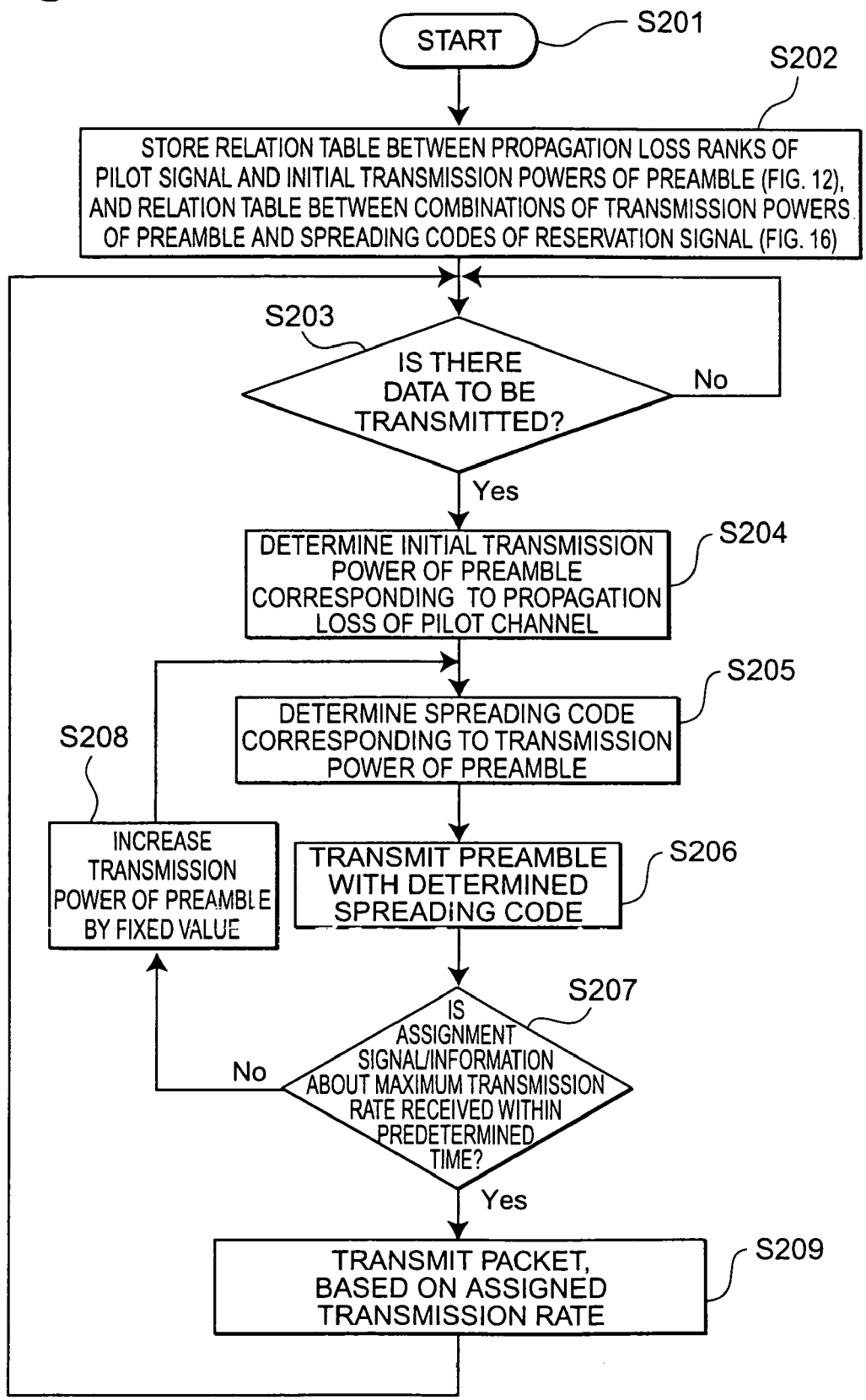
FIG. 8 is a flowchart showing processing at the mobile station according to the third transmission control method.

It is also possible to adopt the processing embodiment like FIGS. 5 and 6 and the processing embodiment like FIGS. 7 and 8 as described above.

Incidentally, in the above embodiments, the number of preamble transmission power ranks of the mobile station corresponding to spreading codes used for the preamble are set according to the number of ranks of uplink transmission rates, and differences between preamble transmission power ranks are set according to differences between preamble transmission powers caused by differences between ranks of uplink transmission rates. In this case, it is preferable that areas corresponding to the respective ranks of preamble transmission powers in a cell be set so as to keep numbers of mobile stations in the respective areas substantially equal according to a distribution of mobile stations within the cell.

Figure 9:
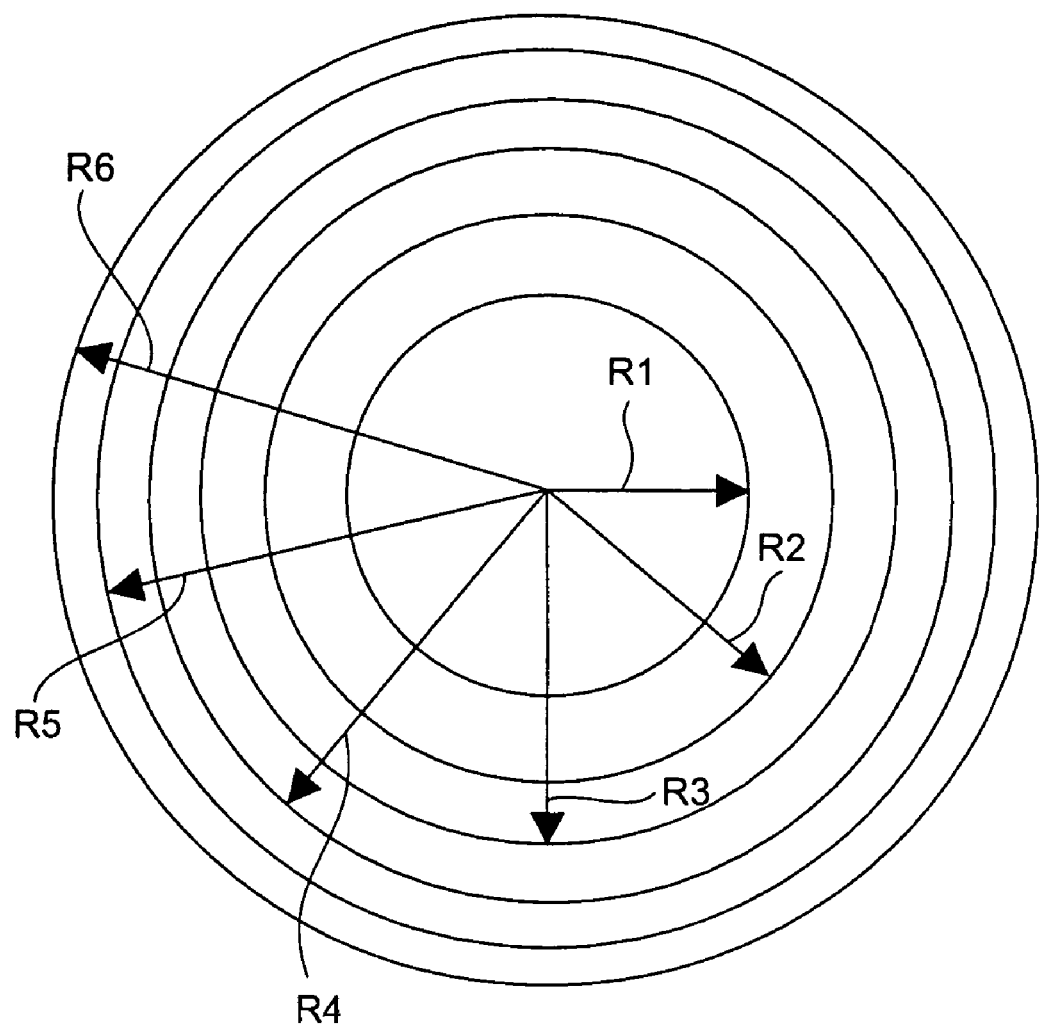
FIG. 9 is a diagram to illustrate an example of equalizing cell areas corresponding to respective transmission power ranks.

For example, where it can be assumed that users of mobile stations are uniformly distributed in a cell, radii of R1–R6 need to be set as described below, in order to equalize cell areas corresponding to respective transmission power ranks (i.e., in order to equalize numbers of distributed users), as shown in FIG. 9.

$R6=\sqrt{6}R1, R5=\sqrt{5}R1, R4=\sqrt{4}R1, R3=\sqrt{3}R1, R2=\sqrt{2}R1$

For example, supposing herein that the propagation loss is attenuated in proportion to the fourth power of distance, the difference between the propagation loss at the radius R1 from the center and the propagation loss at the radius R2, R3, R4, R5, or R6 should be 6 dB, 9.5 dB, 12 dB, 14 dB, or 15.5 dB, respectively. From this, the difference between propagation losses at radius R1 and at radius R2 is 6 dB, the difference between propagation losses at radius R2 and at radius R3 3.5 dB, the difference between propagation losses at radius R3 and at radius R4 2.5 dB, the difference between propagation losses at radius R4 and at radius R5 2 dB, and the difference between propagation losses at radius R5 and at radius R6 1.5 dB.

The differences of propagation losses between ranks are calculated according to the propagation loss attenuation coefficients in this way, and thereafter the propagation loss ranks of the pilot signal are set according to the differences. For example, the table of FIG. 17 shows the relation between propagation loss ranges of the pilot signal and initial transmission power ranges of the preamble; as to the propagation loss ranges of the pilot signal in the left column in this table, the difference of 6 dB between propagation losses at radius R1 and at radius R2 in FIG. 9 corresponds to 6 dB of the propagation loss range (126.5 dB–132.5 dB) of the second rank from the bottom, and the difference of 3.5 dB between propagation losses at radius R2 and at radius R3 to 3.5 dB of the propagation loss range (132.5 dB–136 dB) of the third rank from the bottom. Likewise, the difference of 2.5 dB between propagation losses at radius R3 and at radius R4 corresponds to 2.5 dB of the propagation loss range (136 dB–138.5 dB) of the fourth rank from the bottom; the difference of 2 dB between propagation losses at radius R4 and at radius R5 to 2 dB of the propagation loss range (138.5 dB–140.5 dB) of the next rank; and the difference of 1.5 dB between propagation losses at radius R5 and at radius R6 to 1.5 dB of the propagation loss range (140.5 dB–142 dB) of the next rank.

In accordance with the propagation loss ranks of the pilot signal set as described above, initial values of preamble transmission powers of the respective ranks are set, for example, based on Eq. (1) below. The table of FIG. 17 shows the relationship between initial transmission power ranges of the preamble and propagation loss ranges of the pilot signal set according to Eq. (1) below. Thereafter, the mobile station spreads the preamble with a spreading code corresponding to a transmission power of the preamble set as described above and transmits it.

Transmission power of preamble=24 dBm−(142 dB−propagation loss of pilot signal)        (1)

The numbers of users in the respective ranks become substantially equal, so that probabilities of executing transmission of the preamble with the spreading codes corresponding to the respective ranks also become equal, which provides the advantage of capability of uniformizing probabilities of collision in transmission of the preamble regardless of locations in the cell.

The application of the present invention is not limited only to W-CDMA, but it is a matter of course that the present invention can also be applied to all the radio access systems using spreading codes, such as CDMA2000, multi-carrier CDMA, OFCDM, and so on.

According to the present invention, as described above, in order for the mobile station to notify the base station of the information about the signal interference ratio of the pilot signal therefrom, the mobile station makes a rank of the signal interference ratio of the pilot signal from the base station uniquely corresponding to a spreading code used for spreading of the preamble and transmits the preamble spread with the spreading code, to the base station. The base station can acquire the information about the signal interference ratio of the pilot signal at the mobile station, based on the spreading code of the received preamble and the aforementioned correspondence. This information eliminates the need for the mobile station to separately notify the base station of the information about the signal interference ratio of the pilot signal and permits the base station to determine the optimal transmission power or transmission rate to the mobile station, whereby it is feasible to reduce the volume of data of the control signal and shorten the delay. This is because the method of directly acquiring the information of the signal interference ratio from the spreading code is simpler in processing and shorter in processing delay than the method of coding data to be notified of, transmitting the coded data, further decoding the coded data on the receiver side, and analyzing the contents of the data.

On the occasion of making a spreading code used for transmission of the preamble uniquely corresponding to a rank of transmission power of the preamble and transmitting the preamble from the mobile station to the base station, the mobile station spreads the preamble with the transmission spreading code determined based on the rank of the transmission power of the preamble and the aforementioned correspondence and transmits it; the base station can determine the rank of the transmission power of the preamble from the transmission spreading code of the received preamble and calculate the propagation loss from the mobile station to the base station, based on the difference between the transmission power and the measured reception power of the preamble. This permits the base station to derive a maximum transmissible rate of the mobile station, and makes it feasible to implement effective utilization of radio resources, without allocating the mobile station a radio resource over its potential. In the methods above, the optimal transmission power or transmission rate to the mobile station can also be determined without need for the mobile station to separately transmit the transmission power rank information of the preamble as a control signal to the base station, whereby it is feasible to reduce the data volume of the control signal and shorten the delay.

What is claimed is:

1. A base station configured to perform radio communication based on code division multiplexing with a mobile station which transmits a preamble prior to a start of transmission/reception of data, and to transmit a pilot signal at a predetermined transmission power to the mobile station, the base station comprising:
   preamble receiving means for receiving the preamble spread with a spreading code from the mobile station;
   correspondence storing means storing any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station; and
   determining means for determining at least one of a transmission power and a downlink transmission rate for a signal directed to the mobile station, and an uplink transmission rate for transmission of information from the mobile station, based on at least the spreading code.

2. The base station according to claim 1, further comprising rate instructing means for instructing the mobile station to use the uplink transmission rate determined.

3. The base station according to claim 1, further comprising first setting means for setting a number of ranks of preamble transmission powers of the mobile station corresponding to spreading codes used for the preamble, according to a number of ranks of said uplink transmission rates determined, and for setting a difference between ranks of transmission powers according to a difference between transmission powers caused by a difference between ranks of uplink transmission rates.

4. The base station according to claim 1, wherein areas corresponding to respective ranks of preamble transmission powers in a cell are set so that numbers of mobile stations in the respective areas become substantially equal according to a distribution of mobile stations in the cell.

5. A mobile station configured to perform radio communication based on code division multiplexing with a base station which transmits a pilot signal at a predetermined transmission power, and to transmit a preamble to the base station prior to a start of transmission/reception of data, the mobile station comprising:
   correspondence storing means storing any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station; and
   spreading means for spreading the preamble with the spreading code corresponding to any one of the reception power or the signal interference ratio about the pilot signal at the mobile station, the preamble transmission power of the mobile station, and the combination of the reception power or the signal interference ratio of the pilot signal at the mobile station with the preamble transmission power of the mobile station, based on said correspondence.

6. A communication system comprising a base station configured to transmit a pilot signal at a predetermined transmission power, and a mobile station configured to transmit a preamble to the base station prior to a start of transmission/reception of data, the communication system being configured to implement radio communication based on code division multiplexing between the base station and the mobile station,
   wherein the mobile station comprises:
   spreading means for spreading the preamble with a spreading code corresponding to any one of the reception power or the signal interference ratio about the pilot signal at the mobile station, the preamble transmission power of the mobile station, and the combination of the reception power or the signal interference ratio of the pilot signal at the mobile station with the preamble transmission power of the mobile station, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station; and
   preamble transmitting means for transmitting the preamble after the spreading process to the base station; and
   wherein the base station comprises:
   determining means for determining at least one, of a transmission power and a downlink transmission rate for a signal directed to the mobile station, and an uplink transmission rate for transmission of information from the mobile station, corresponding to at least the spreading code, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station.

7. A communication system according to claim 6 is characterized, wherein the base station further comprises rate instructing means for instructing the mobile station to use the uplink transmission rate determined.

8. A transmission control method of implementing radio communication based on code division multiplexing between a base station configured to transmit a pilot signal at a predetermined transmission power and a mobile station configured to transmit a preamble to the base station prior to a start of transmission/reception of data, the transmission control method comprising:
- a spreading step wherein the mobile station determines a spreading code corresponding to any one of the reception power or the signal interference ratio about the pilot signal at the mobile station, the preamble transmission power of the mobile station, and the combination of the reception power or the signal interference ratio of the pilot signal at the mobile station with the preamble transmission power of the mobile station, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station, and the mobile station spreads the preamble with the determined spreading code;
- a preamble transmitting step wherein the mobile station transmits the preamble after the spreading process to the base station; and
- a rate determining step wherein the base station determines at least one of a transmission power and a downlink transmission rate for a signal directed to the mobile station, and an uplink transmission rate for transmission of information from the mobile station, corresponding to at least the spreading code, based on any one of correspondence information between the spreading code used for the preamble and, the reception power or the signal interference ratio of the pilot signal at the mobile station, correspondence information between the spreading code and the preamble transmission power of the mobile station, and correspondence information between the spreading code and the combination of the reception power or the signal interference ratio of the pilot signal at the mobile station with the preamble transmission power of the mobile station.

9. A transmission control method according to claim 8, further comprising rate instructing step wherein the base station instructs the mobile station. to use the uplink transmission rate determined.

10. A mobile station control program to be executed by a computer provided in a mobile station configured to perform radio communication based on code division multiplexing with a base station which transmits a pilot signal at a predetermined transmission power, and to transmit a preamble to the base station prior to a start of transmission/reception of data,
- the mobile station storing correspondence information between a spreading code used for the preamble, and a reception power or a signal interference ratio of the pilot signal at the mobile station, correspondence information between the spreading code and a preamble transmission power of the mobile station, or correspondence information between the spreading code and a combination of a reception power or a signal interference ratio of the pilot signal at the mobile station with a preamble transmission power of the mobile station, the mobile station control program comprising:
- a spreading step of spreading the preamble with the spreading code corresponding to the reception power or the signal interference ratio of the pilot signal at the mobile station, the preamble transmission power of the mobile station, or the combination of the reception power or the signal interference ratio of the pilot signal at the mobile station with the preamble transmission power of the mobile station, based on the correspondence information stored; and
- a transmitting step of transmitting the preamble after the spreading step to the base station.

* * * * *